(12) United States Patent
Sakai et al.

(10) Patent No.: US 12,377,400 B2
(45) Date of Patent: Aug. 5, 2025

(54) WATER PURIFICATION FILTER

(71) Applicant: UNITIKA LTD., Osaka (KR)

(72) Inventors: Maiko Sakai, Kyoto (KR); Norihiro Naito, Kyoto (KR)

(73) Assignee: UNITIKA LTD., Osaka (KR)

(*) Notice: Subject to any disclaimer, the term of this patent is extended or adjusted under 35 U.S.C. 154(b) by 611 days.

(21) Appl. No.: 17/801,397

(22) PCT Filed: Jan. 22, 2021

(86) PCT No.: PCT/JP2021/002327
§ 371 (c)(1),
(2) Date: Aug. 22, 2022

(87) PCT Pub. No.: WO2021/171854
PCT Pub. Date: Sep. 2, 2021

(65) Prior Publication Data
US 2023/0113769 A1    Apr. 13, 2023

(30) Foreign Application Priority Data

Feb. 27, 2020    (KR) .............................. 2020-032300
Sep. 2, 2020    (KR) .............................. 2020-147398

(51) Int. Cl.
*B01J 20/20*    (2006.01)
*B01J 20/26*    (2006.01)
(Continued)

(52) U.S. Cl.
CPC .............. *B01J 20/20* (2013.01); *B01J 20/262* (2013.01); *B01J 20/28011* (2013.01); *B01J 20/28023* (2013.01); *C02F 1/28* (2013.01)

(58) Field of Classification Search
CPC .... B01J 20/20; B01J 20/262; B01J 20/28011; B01J 20/28023; B01J 20/2804;
(Continued)

(56) References Cited

U.S. PATENT DOCUMENTS

2008/0057309 A1    3/2008    Liu

FOREIGN PATENT DOCUMENTS

EP        1057915        12/2000
JP        04126585        4/1992
(Continued)

OTHER PUBLICATIONS

Patent Cooperation Treaty (PCT), International Search Report and Written Opinion for Application PCT/JP2021/002327 filed on Jan. 22, 2021, mailed Mar. 9, 2021, International Searching Authority, JP.

*Primary Examiner* — Thuan D Dang
(74) *Attorney, Agent, or Firm* — McDonald Hopkins LLC (57) ABSTRACT

An object of the present invention is to provide a water purification filter comprising activated carbon as a filtration material and a biodegradable polymer as a binder component, which water purification filter has a filtration flow rate sufficient for practical use as a pot-type water purifier while maintaining a certain free residual chlorine filtration capacity, and has a certain degree of hardness and excellent handleability. Provided is a water purification filter obtained by winding a nonwoven sheet containing fibrous activated carbon and a heat fusible core-sheath composite fiber and then heat fusing the sheet, wherein the heat fusible core-sheath composite fiber includes a sheath portion containing a biodegradable polyester resin having a melting point of 80 to 140° C. and a core portion containing a synthetic resin having a melting point at least 20° C. higher than the melting point of the biodegradable polyester resin, and wherein the water purification filter has a density of 0.12 to 0.30 g/cm$^3$ and a specific surface area of 500 to 1800 m$^2$/g.

7 Claims, 1 Drawing Sheet

(51) Int. Cl.
*B01J 20/28* (2006.01)
*C02F 1/28* (2023.01)

(58) Field of Classification Search
CPC ....... B01J 20/28057; C02F 1/28; C02F 1/003; C02F 2303/185; C02F 2307/04; C02F 1/283
See application file for complete search history.

(56) References Cited

FOREIGN PATENT DOCUMENTS

| | | |
|---|---|---|
| JP | 2002177148 | 6/2002 |
| JP | 2004504126 | 2/2004 |
| JP | 2006200085 | 8/2006 |
| JP | 2015110228 | 6/2015 |
| JP | 2019214032 | 12/2019 |
| WO | 200187777 | 11/2001 |

WATER PURIFICATION FILTER

CROSS-REFERENCE TO RELATED APPLICATION

This application is a 35 U.S.C. 371 national stage filing of PCT Application No. PCT/JP2021/002327 filed on Jan. 22, 2021, which claims the benefit of Japanese Patent Application No. 2020-032300, filed on Feb. 27, 2020, and also claims the benefit of Japanese Patent Application No. 2020-147398 filed on Sep. 2, 2020, each of which are incorporated herein in their entirety by reference.

TECHNICAL FIELD

The present invention relates to a water purification filter.

BACKGROUND ART

Water purification filters produced using activated carbon have heretofore been used for water purification, such as for removal of free residual chlorine from tap water, and various water purification filters have been developed.

Water purification filters are known that contain activated carbon as a filtration material and a binder component for binding the activated carbon together.

After these water purification filters are used, they are disposed of as household waste by incineration, landfilling, or the like. From the viewpoint of global environmental protection, these water purification filters are required to achieve energy savings for incineration or improved biodegradability for landfilling.

One method to improve the biodegradability of a water purification filter is, for example, to use a biodegradable material as the binder component. One known water purification filter produced using a biodegradable binder component is, for example, a purification material for fluids, which comprises an aluminosilicate and a binder therefor, and is in the form of a porous block or a sheet, wherein the binder is a biodegradable polymer (see, for example, Patent Literature 1).

CITATION LIST

Patent Literature

Patent Literature 1: JP-A-2004-504126

SUMMARY OF INVENTION

Technical Problem

However, the purification material disclosed in Patent Literature 1 is obtained by molding granulated charcoal or the like by compression or the like, and has a low filtration flow rate. Thus, unfortunately, when this purification material is used as a filter for a pot-type (pitcher-type) water purifier, in which raw water stored in the reservoir drops under its own weight and passes through the filter to be purified, the filtration requires a great deal of time.

Thus, the present inventors conceived of using fibrous and bulky (low density) activated carbon as a filtration material and a fibrous and bulky (low density) biodegradable binder component, in order to increase the filtration flow rate of the purification material disclosed in Patent Literature 1. However, the present inventors found from their research that, unfortunately, simply using fibrous activated carbon as a filtration material and a fibrous biodegradable binder component cannot increase the filtration flow rate while maintaining a certain free residual chlorine filtration capacity, and also reduces the filter hardness, resulting in poor handleability.

Accordingly, it is an object of the present invention to provide a water purification filter comprising activated carbon as a filtration material and a biodegradable polymer as a binder component, wherein fibers of the activated carbon are fused to one another with the biodegradable polymer, which water purification filter has a filtration flow rate sufficient for practical use as a pot-type water purifier while maintaining a certain free residual chlorine filtration capacity, and has a certain degree of hardness and excellent handleability.

Solution to Problem

The present inventors conducted research on the foregoing problem. For example, when a fibrous biodegradable binder composed of a single biodegradable polyester resin is used as a binder for a water purification filter, the biodegradable polyester resin itself has low fluidity upon heat melting and thus, needs to be heat treated at a temperature near its melting point and melted, in order to sufficiently adhere fibers of activated carbon to one another. This heat treatment may cause the entire fibrous biodegradable binder to be easily thermally deformed, for example, the fibrous binder may be deformed into a film shape and collapse. The present inventors found that this may cause the number of voids in the water purification filter to decrease, leading to a poor filtration flow rate of the resulting water purification filter.

The present inventors then conceived that this might be solved by using a heat fusible core-sheath composite fiber, wherein a sheath portion contains a biodegradable polyester resin, and a core portion contains a synthetic resin having a melting point at least 20° C. higher than the melting point of the biodegradable polyester resin, as a binder for a water purification filter. However, when this heat fusible core-sheath composite fiber is used, the filter may become brittle, or the core portion of the heat fusible core-sheath composite fiber may be thermally deformed and flattened in the heat treatment for adhesion. The present inventors conducted research on this cause. As a result, they found that the biodegradable polyester resin has relatively low fluidity upon heat melting, such that the adhesion between fibers of activated carbon tends to be relatively poor compared to when using other polyesters; and that, because the biodegradable polyester resin itself is relatively hard and brittle, the resulting water purification filter may have poor mechanical strength and the like, and poor handleability. The present inventors also found that, if the heat treatment temperature for adhesion is increased to increase the fluidity upon heat melting of the biodegradable polyester resin as a binder component disposed as the sheath portion, the core portion in the heat fusible core-sheath composite fiber may become easily thermally deformed, which causes the number of voids in the water purification filter to decrease, leading to a poor filtration flow rate of the resulting water purification filter.

The present inventors thus conducted extensive research. The present inventors have selected a heat fusible core-sheath composite fiber wherein a biodegradable polyester resin having a melting point of 80 to 140° C. as the biodegradable polyester resin to be disposed as the sheath portion and wherein the difference between the melting point of the synthetic resin to be disposed as the core portion and the melting point of the biodegradable polyester resin to be disposed as the sheath portion (the melting point of the synthetic resin–the melting point of the biodegradable polyester resin) to 20° C. or higher. It was found that such biodegradable polyester resin can have a relatively low melting point to be easily heat treated for adhesion, and can have appropriate fluidity upon melting, such that the core portion in the heat fusible core-sheath composite fiber can be prevented from thermal deformation.

Additionally, the present inventors found that, by selecting fibrous activated carbon as a filtration material for a water purification filter, and winding a woven sheet containing the fibrous activated carbon and the above-described heat fusible core-sheath composite fiber and then heat fusing the sheet, and also by setting the specific surface area of the filter to 500 to 1800 m²/g, and the filter density to 0.12 to 0.30 g/cm³, a water purification filter can be provided that has a filtration flow rate suitable for use as a pot-type water purifier while maintaining a certain free residual chlorine filtration capacity, and has a certain degree of hardness and excellent handleability In summary, the present invention provides embodiments of the invention as itemized below:

Item 1. A water purification filter obtained by winding a nonwoven sheet containing fibrous activated carbon and a heat fusible core-sheath composite fiber and then heat fusing the sheet, wherein
  a sheath portion of the heat fusible core-sheath composite fiber contains a biodegradable polyester resin having a melting point of 80 to 140° C.,
  a core portion of the heat fusible core-sheath composite fiber contains a synthetic resin having a melting point at least 20° C. higher than the melting point of the biodegradable polyester resin, and
  the water purification filter has a density of 0.12 to 0.30 g/cm³ and a specific surface area of 500 to 1800 m²/g.

Item 2. The water purification filter according to item 1, wherein the biodegradable polyester resin is an aliphatic polyester resin.

Item 3. The water purification filter according to item 2, wherein the aliphatic polyester resin is polylactic acid, polyethylene succinate, polybutylene succinate, polybutylene succinate adipate, polybutylene adipate terephthalate, polyethylene terephthalate succinate, or 3-hydroxybutyrate-co-3-hydroxyhexanoate polymer.

Item 4. The water purification filter according to any one of items 1 to 3, wherein the water purification filter has a cylindrical or columnar shape.

Item 5. The water purification filter according to any one of items 1 to 4, wherein the water purification filter is used as a filter for a pot-type water purifier.

Item 6. A method of purifying water, comprising passing raw water to be purified through the water purification filter according to any one of items 1 to 5.

Item 7. The method of purifying water according to claim 6, wherein the method is performed using a pot-type water purifier.

Advantageous Effects of Invention

The water purification filter of the present invention comprising the features of the present invention can be provided as a water purification filter comprising activated carbon as a filtration material and a biodegradable polymer as a binder component, wherein fibers of the activated carbon are fused to one another with the biodegradable polymer, which water purification filter has a filtration flow rate sufficient for practical use as a pot-type water purifier while maintaining a certain free residual chlorine filtration capacity, and has a certain degree of hardness and excellent handleability.

DESCRIPTION OF EMBODIMENTS

A. Water Purification Filter

A water purification filter according to the present invention is a water purification filter obtained by winding a nonwoven sheet containing fibrous activated carbon and a heat fusible core-sheath composite fiber and then heat fusing the sheet, wherein a sheath portion of the heat fusible core-sheath composite fiber contains a biodegradable polyester resin having a melting point of 80 to 140° C., a core portion of the heat fusible core-sheath composite fiber contains a synthetic resin having a melting point at least 20° C. higher than the melting point of the biodegradable polyester resin, and the water purification filter has a density of 0.12 to 0.30 g/cm³ and a specific surface area of 500 to 1800 m²/g. Materials and the like constituting the water filtration filter of the present invention will be hereinafter described in detail.

<Activated Carbon>

The water purification filter of the present invention contains fibrous activated carbon. Because the biodegradable polyester resin itself serving as a binder component is relatively hard and brittle, the resulting water purification filter may have poor mechanical strength and the like, and poor handleability; however, in the water purification filter of the present invention, the activated carbon itself is also fibrous, which helps to reduce the brittleness due to the biodegradable polyester resin, leading to excellent handleability of the water purification filter.

The fibrous activated carbon contained in the water purification filter of the present invention preferably has a specific surface area of 600 to 3000 m²/g, more preferably 1000 to 2000 m²/g, from the viewpoint of further increasing the strength of the water purification filter, while allowing the below-mentioned range of specific surface area of the water purification filter to be more easily satisfied. In addition to this, from the viewpoint of further preventing the formation of coal dust during initial use of the water purification filter of the present invention, the specific surface area is still more preferably 1100 to 1500 m²/g, and particularly preferably 1200 to 1400 m²/g. As used herein, the specific surface area of the fibrous activated carbon is the value as calculated based on a nitrogen adsorption isotherm at 77.4 K. The nitrogen adsorption isotherm is created specifically as follows: A measurement sample is cooled to 77.4 K (the boiling point of nitrogen), nitrogen gas is introduced, and the amount of nitrogen gas adsorbed V [cc/g] is measured using the volumetric method. In the measurement, the pressure P [hPa] of nitrogen gas being introduced is gradually increased, and the value obtained by dividing the pressure P [hPa] by the saturation vapor pressure P0 [hPa] of nitrogen gas is defined as the relative pressure P/P0. Amounts of nitrogen gas adsorbed are plotted against these relative pressures to create a nitrogen adsorption isotherm. The amount of nitrogen gas adsorbed can be measured using a commercially available automatic gas adsorption volume measuring apparatus (for example, trade name "AUTOSORB-1-MP" (QUANTCHROME)). The specific surface area is determined herein according to the BET method, based on the nitrogen adsorption isotherm. This analysis can be performed using known means such as the analysis programs included in the apparatus.

The fibrous activated carbon contained in the water purification filter of the present invention preferably has an average fiber diameter of 5 to 30 μm, more preferably 10 to 25 μm, still more preferably 14 to 19 μm. These ranges of average fiber diameter allow the free residual chlorine filtration capacity and the filtration flow rate to be more easily achieved simultaneously. As used herein, the average fiber diameter of the fibrous activated carbon is the value as measured using a reflection microscope according to "7.3.1 Fiber diameter" in the Japanese Industrial Standard JIS K 1477:2007 "Test methods for fibrous activated carbon".

The water purification filter of the present invention may also contain activated carbon other than the fibrous activated carbon, for example, granular activated carbon, as long as it achieves the effects of the present invention.

The content (% by mass) of the fibrous activated carbon in the water purification filter of the present invention is, for example, 50 to 90% by mass, although not limited thereto. In particular, from the viewpoint of more satisfactorily producing the effect of preventing the formation of coal dust during initial use of the water purification filter of the present invention, and the effect of increasing the density of the water purification filter to improve the handleability of the filter, while maintaining a certain free residual chlorine filtration capacity and filtration flow rate, the content of the fibrous activated carbon is preferably 50 to 70% by mass, and more preferably 55 to 65% by mass.

Fibers containing a biodegradable polyester resin as a binder component have higher affinity for water and a higher heat shrinkage percentage than those of fibers containing copolymerized polyethylene terephthalate or a polyolefin as a binder component. The present inventors found that, in an activated carbon filter produced using the fibers containing a biodegradable polyester resin as a binder component, the fibers undergo relatively large heat shrinkage when the biodegradable polyester resin is heat melted for molding of the filter, which increases the filter density to a certain degree, compared to that of an activated carbon filter produced using the fibers containing copolymerized polyethylene terephthalate or a polyolefin as a binder component. Moreover, the content of the biodegradable polyester resin can be increased by setting the content of the activated carbon to 50 to 70% by mass, particularly preferably 55 to 65% by mass. As a result, the resulting filter can have a relatively higher filter density and thus, higher filter hardness and higher handleability, while having higher affinity for water (compatibility with water) and maintaining a certain filtration flow rate. Additionally, formation of coal dust during initial use of the filter can be more easily prevented by setting the content of the activated carbon to 50 to 70% by mass, preferably 55 to 65% by mass.

<Heat Fusible Core-Sheath Composite Fiber>

The water purification filter of the present invention contains a heat fusible core-sheath composite fiber as a binder. The heat fusible core-sheath composite fiber includes a sheath portion formed of a biodegradable polyester resin having a melting point of 80 to 140° C. In the water purification filter of the present invention, fibers of the activated carbon are fused to one another with the sheath portion in an at least partially solidified state after being softened or melted. The heat fusible core-sheath composite fiber also includes a core portion formed of a synthetic resin. The difference between the melting point of the synthetic resin and the melting point of the biodegradable polyester resin (the melting point of the synthetic resin contained as the core portion–the melting point of the biodegradable polyester resin) is 20° C. or higher.

As used herein, "biodegradability" refers to the property of a substance to be degraded by microorganisms. Specifically, the property is such that when the substance is placed in an environment with appropriate moisture and temperature (for example, in compost or soil), hydrolysis of the substance is promoted, and then degradation of the substance by microorganisms proceeds, and ultimately the substance degrades into carbon dioxide and water, which can be recycled in nature.

Preferred biodegradability of the biodegradable polyester resin used as the sheath portion is such that the biodegradability as measured according to the Japanese Industrial Standard JIS K 6953-1:2011 "Determination of the ultimate aerobic biodegradability of plastic materials under controlled composting conditions—Method by analysis of evolved carbon dioxide—Part 1: General method" is 60% or more over a period of 180 days.

Alternatively, preferred biodegradability of the biodegradable polyester resin used as the sheath portion is such that, under the active degradation conditions according to the method as specified in DIN EN ISO 14855-1:2012 "Determination of the ultimate aerobic biodegradability of plastic materials under controlled composting conditions—Method by analysis of evolved carbon dioxide—Part 1: General method", at least 60% by mass of organic carbons in the biodegradable polyester resin are converted to carbon dioxide over a period of 180 days.

The biodegradable polyester resin used as the sheath portion is preferably an aliphatic polyester resin. The aliphatic polyester resin is preferably polylactic acid, polyethylene succinate, polybutylene succinate, polybutylene succinate adipate, polybutylene adipate terephthalate, polyethylene terephthalate succinate, or 3-hydroxybutyrate-co-3-hydroxyhexanoate polymer. Preferred among these aliphatic polyester resins is, for example, polylactic acid or polybutylene succinate, from the viewpoint of increasing the affinity for water to achieve higher water permeability of the water purification filter, while achieving higher bondability to the below-described synthetic resin contained as the core portion.

The melting point of the biodegradable polyester used as the sheath portion is 80 to 140° C. The biodegradable polyester resin having a melting point of 80 to 140° C. can exhibit appropriate fluidity upon melting in a heat treatment for adhering fibers of the fibrous activated carbon to one another. This provides adhesion between fibers of the fibrous activated carbon to more easily prevent thermal deformation of the core portion in the heat fusible core-sheath composite fiber due to the heat treatment, while maintaining the pores of the fibrous activated carbon (the pores are not significantly filled with the binder component). The melting point of the biodegradable polyester resin used as the sheath portion is preferably 100 to 140° C., more preferably 110 to 140° C., and still more preferably 115 to 135° C.

As used herein, the melting point is the value as measured using a differential scanning calorimeter (DSC). Specifically, a DSC is used to obtain a melting endothermic curve by measurement at a heating rate of 20° C./min, and the temperature giving the extreme value in the melting endothermic curve is defined as the melting point.

When polylactic acid forms the sheath portion, one suitable example of the polylactic acid is a copolymer of D-lactic acid and L-lactic acid having a melting point of 110 to 140° C. (more preferably 115 to 135° C.). Lactic acid monomers constituting the polylactic acid include optical isomers of D-form (D-lactic acid) and L-form (L-lactic acid). The melting point of the polylactic acid can be controlled by, for example, copolymerizing the L-form with about 3 mol % of the D-form to give polylactic acid having a melting point of about 150° C.; copolymerizing the L-form with about 7 mol % of the D-form to give polylactic acid having a melting point of about 140° C.; or copolymerizing the L-form with about 12 mol % of the D-form to give polylactic acid having a melting point of about 110° C.

When polylactic acid forms the sheath portion, the D-lactic acid content in the polylactic acid is preferably 7 to 12 mol %.

As used herein, the D-lactic acid content in the polylactic acid is the value as determined using the following measurement method: First, 0.3 g of the polylactic acid to be measured is weighed out and added to 6 mL of 1 N-potassium hydroxide/methanol solution, and the mixture is stirred thoroughly at 65° C. Then, 450 µL of sulfuric acid is added and the mixture is stirred at 65° C. to cause degradation of the polylactic acid, and then 5 mL of the resultant sample is measured out. This sample is mixed with 3 mL of pure water and 13 mL of methylene chloride, and shaken. After the mixture is allowed to separate, about 1.5 mL of the lower organic phase is collected and filtered through a disc filter for HPLC with a pore size of 0.45 µm, and then the resultant product is subjected to measurement by gas chromatography (for example, HP-6890 Series GC system: Hewlett Packard). The ratio (%) of the peak area of D-lactic acid methyl ester to the total peak area of lactic acid methyl ester is calculated as the D-lactic acid content (mol %) in the polylactic acid.

The biodegradable polyester resin used as the sheath portion has a melt flow rate (MFR) of 5 to 20 g/10 min, for example. As used herein, the MFR is the value as measured under a test temperature of 190° C. and a load of 2.16 kg, according to "Method A: mass measurement method" as specified in the Japanese Industrial Standard JIS K7210-1: 2014 "Plastics-Determination of the melt mass-flow rate (MFR) and melt volume-flow rate (MVR) of thermoplastics—Part 1: Standard method".

The core portion is formed of a synthetic resin having a melting point at least 20° C. higher than the melting point of the biodegradable polyester resin used as the sheath portion. The melting point of the synthetic resin used as the core portion is preferably at least 20° C. higher than the melting point of the biodegradable polyester resin used as the sheath portion. Specifically, the difference between the melting point of the synthetic resin used as the core portion and the melting point of the biodegradable polyester resin used as the sheath portion (the melting point of the synthetic resin used as the core portion–the melting point of the biodegradable polyester resin used as the sheath portion) is 20 to 150° C. preferably 30 to 70° C. more preferably 30 to 60° C., and still more preferably 35 to 55° C.

The melting point of the synthetic resin used as the core portion may be any as long as the difference between the melting point of the synthetic resin and the melting point of the biodegradable polyester resin used as the sheath portion falls in the above-mentioned ranges. Specifically, the melting point of the synthetic resin is 100 to 260° C., preferably 130 to 210° C., more preferably 150 to 200° C., still more preferably 150 to 190° C., and particularly preferably 160 to 170° C.

The synthetic resin used as the core portion is not limited in type as long as it has a melting point at least 20° C. higher than the melting point of the biodegradable polyester resin used as the sheath portion. Examples of the synthetic resin include polyester resins and polyamide resins. Preferred among these is a biodegradable polyester resin, from the viewpoint of further improving the biodegradability of the water purification filter of the present invention.

When a biodegradable polyester resin is used as the core portion, the biodegradability of the biodegradable polyester resin as measured according to the Japanese Industrial Standard JIS K 6953-1:2011 "Determination of the ultimate aerobic biodegradability of plastic materials under controlled composting conditions—Method by analysis of evolved carbon dioxide—Part 1: General method" is preferably 60% or more over a period of 180 days. When a biodegradable polyester resin is used as the core portion, another preferred example of the biodegradability of the biodegradable polyester resin is such that, under the active degradation conditions according to the method as specified in DIN EN ISO 14855-1:2012 "Determination of the ultimate aerobic biodegradability of plastic materials under controlled composting conditions—Method by analysis of evolved carbon dioxide—Part 1: General method", at least 60% by mass of organic carbons in the biodegradable polyester resin are converted to carbon dioxide over a period of 180 days.

When a biodegradable polyester resin is used as the core portion, the biodegradable polyester resin is preferably an aliphatic polyester resin. Specifically, the aliphatic polyester resin is polylactic acid, polyethylene succinate, polybutylene succinate, polybutylene succinate adipate, polybutylene adipate terephthalate, polyethylene terephthalate succinate, or 3-hydroxybutyrate-co-3-hydroxyhexanoate polymer, for example.

When a biodegradable polyester resin is used as the core portion, the biodegradable polyester resin is preferably a biodegradable polyester resin having a melting point of 150 to 200° C. (preferably 150 to 190° C., more preferably 160 to 170° C.); and more preferably a copolymer of D-lactic acid and L-lactic acid having a melting point of 150 to 190° C. (preferably 160 to 170° C.), from the viewpoint of further improving the biodegradability of the water purification filter of the present invention; more satisfactorily producing the effect of preventing thermal deformation of the core portion of the core-sheath composite fiber due to the heat treatment for adhesion of the fibrous activated carbon; and more satisfactorily producing the effect of increasing the filter density. The D-form content in the polylactic acid is, for example, 0.5 to 2 mol %, and preferably 1 to 2 mol %.

The synthetic resin used as the core portion preferably has a glass transition point of 50 to 65° C., although not limited thereto, from the viewpoint of further preventing thermal deformation of the core portion of the core-sheath composite fiber due to the heat treatment for adhesion of the fibrous activated carbon. As used herein, the glass transition point is the value as measured using a differential scanning calorimeter (DSC). Specifically, a DSC is used to obtain a heating curve by measurement at a heating rate of 20° C./min, and the glass transition point is determined as the intermediate value between the temperatures at the two inflection points derived from glass transition in the heating curve.

The mass ratio of the core portion to the sheath portion (core portion/sheath portion) of the heat fusible core-sheath composite fiber is, for example, 3/7 to 7/3, and preferably 4/6 to 6/4, although not limited thereto.

The heat fusible core-sheath composite fiber has a fineness of, for example, 1 to 5 dtex, preferably 1 to 3 dtex, although not limited thereto. As used herein, the fineness is the value as measured according to "Method A" as specified in "8.5.1 Fineness based on corrected mass" of the Japanese Industrial Standard JIS L 1015:2010 "Test methods for man-made staple fibres".

The heat fusible core-sheath composite fiber has an average fiber length of, for example, 10 to 100 mm, preferably 30 to 70 mm, more preferably 40 to 60 mm, although not limited thereto. As used herein, the average fiber length is the value as measured according to "Direct method (method C)" as specified in "8.4.1 Average fiber length" of the Japanese Industrial Standard JIS L 1015:2010 "Test methods for man-made staple fibres".

The heat fusible core-sheath composite fiber preferably has a circular cross-sectional shape, although not limited thereto.

The content (mass %) of the heat fusible core-sheath composite fiber in the water purification filter of the present invention is, for example, 10 to 50% by mass, although not limited thereto. In particular, from the viewpoint of more satisfactorily producing the effect of preventing the formation of coal dust during initial use of the water purification filter of the present invention, and the effect of increasing the density of the water purification filter to improve the handleability of the filter, while maintaining a certain free residual chlorine filtration capacity and filtration flow rate, the content of the heat fusible core-sheath composite fiber in the water purification filter of the present invention is preferably 30 to 50% by mass, and more preferably 35 to 45% by mass.

<Water Purification Filter>

The water purification filter of the present invention has a structure of a wound and thermally fused nonwoven sheet containing the fibrous activated carbon and the heat fusible core-sheath composite fiber. Examples of shapes of the water purification filter of the present invention include a cylindrical or columnar shape. When the water purification filter of the present invention has a cylindrical shape, it may have any shape having a space (hollow portion) communicating in the height direction from the center of one bottom surface to the center of the other bottom surface.

Figure 1:
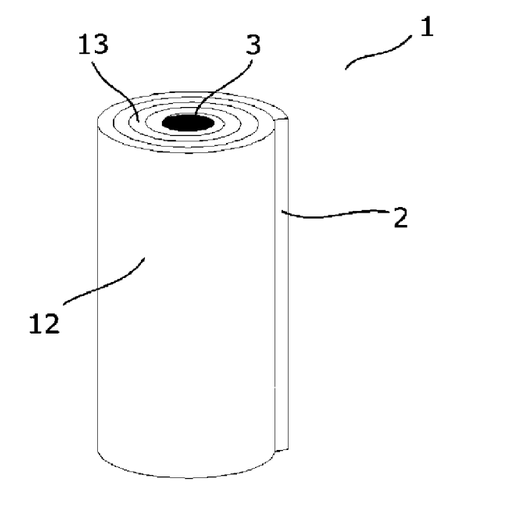
FIG. 1 is a schematic perspective view illustrating one exemplary water purification filter, molded with the nonwoven sheet being in a wound state.

FIG. 1 is a schematic perspective view illustrating one exemplary cylindrical water purification filter 1, molded with a nonwoven sheet 2 being in a wound state. In FIG. 1, the water purification filter 1 has been molded with the nonwoven sheet 2 being in a spirally wound state. The water purification filter 1 is configured such that the longitudinal direction of the nonwoven sheet 2 is perpendicular to the height direction of the water purification filter 1 (vertical direction on the paper). In the water purification filter 1 shown in FIG. 1, a front or back surface of the nonwoven sheet 2 forms a side surface 12 of the water purification filter 1, and longitudinal edges (ears) of the nonwoven sheet 2 are spirally arranged to form a bottom surface 13 of the water purification filter 1. The water purification filter shown in FIG. 1 is an example of a cylindrical water purification filter having a space 3 communicating in the height direction through the center of the water purification filter 1. The water to be purified is preferably radially passed through the water purification filter 1. Because the longitudinal edges of the nonwoven sheet 2 are thus arranged in a plurality of layers to form the bottom surface of the water purification filter 1, the hardness of the bottom surface can be increased to improve the handleability. Moreover, because the nonwoven sheet 2 has been wound under tension, the water purification filter 1 is compressed radially from the side surface 12 toward the center, which increases the hardness of the side surface 12 to improve the handleability.

The water purification filter of the present invention has a density of 0.12 to 0.30 g/cm$^3$. When this range of density is satisfied, the water purification filter of the present invention can have a filtration flow rate suitable for use as a pot-type water purifier while maintaining a certain free residual chlorine filtration capacity. The density of the water purification filter of the present invention is preferably 0.14 to 0.25 g/cm$^3$, more preferably 0.140 to 0.189 g/cm$^3$, still more preferably 0.140 to 0.175 g/cm$^3$, and particularly preferably 0.140 to 0.167 g/cm$^3$, from the viewpoint of more satisfactorily achieving an increased filtration flow rate and simultaneously, achieving increased hardness and excellent handleability. As used herein, the density of the water purification filter is the value as determined as follows: The water purification filter is dried at 80° C. in a hot air dryer for 3 hours, and cooled to room temperature in a desiccator. Then, the mass of the water purification filter is measured, and the resultant mass (g) is divided by the volume (cm$^3$) of the water purification filter to obtain the density. The density can be adjusted by adjusting the weight and thickness of the nonwoven sheet to be wound, or by adjusting the tension during the winding. Alternatively, the density can be adjusted according to the type of the nonwoven sheet. Specifically, nonwoven sheets are broadly classified as drylaid nonwoven fabrics, such as needle-punched nonwoven fabrics, and wetlaid nonwoven fabrics, such as nonwoven fabrics produced by wetlaid paper-making. Drylaid nonwoven fabrics have a longer fiber length and are bulkier, and thus, have a lower density, compared to wetlaid nonwoven fabrics. Thus, for example, when the heat fusible core-sheath composite fiber contains polylactic acid as a binder, the density of the water purification filter may be adjusted using the above-described adjusting method to about 0.12 to 0.20 g/cm$^3$ for a drylaid nonwoven fabric or about 0.20 to 0.40 g/cm$^3$ for a wetlaid nonwoven fabric.

The water purification filter of the present invention has a specific surface area of 500 to 1800 m$^2$/g. When this range of specific surface area is satisfied, the water purification filter of the present invention can have excellent handleability as an activated carbon filter while maintaining a certain free residual chlorine filtration capacity. In particular, from the viewpoint of more satisfactorily producing the effect of preventing the formation of coal dust during initial use of the water purification filter of the present invention, and the effect of increasing the density of the water purification filter to improve the handleability of the filter, while maintaining a certain free residual chlorine filtration capacity and filtration flow rate, the specific surface area of the water purification filter of the present invention is preferably 650 to 800 m$^2$/g, and more preferably 700 to 775 m$^2$/g. As used herein, the specific surface area of the water purification filter is the value as calculated based on a nitrogen adsorption isotherm at 77.4 K. The specific measurement method is the same as employed for the fibrous activated carbon. The specific surface area of the water purification filter can be adjusted by adjusting the specific surface area and content of the fibrous activated carbon, or adjusting the content of the biodegradable polyester resin to be disposed as the sheath portion of the heat fusible core-sheath composite fiber, and the heat treatment conditions for adhesion of the fibrous activated carbon.

The bottom surface of the water purification filter of the present invention preferably has a hardness of 10 to 75, more preferably 30 to 70, still more preferably 30 to 50, although not limited thereto, from the viewpoint of more satisfactorily producing the effect of reducing cracking or chipping in the water purification filter; the effect of improving the handleability; and the effect of improving the filtration flow rate. As used herein, the bottom surface hardness of the water purification filter is the value as measured using a durometer. The specific measurement method is as follows: First, the bottom surface of the water purification filter is fixed horizontally. Then, using a durometer having a hemispherical indenter shape with a diameter of 5.08±0.02 mm, the presser foot is contacted with the bottom surface of the water purification filter disposed as the upper side so that the durometer indenter is vertical to the bottom surface, and then immediately the measurement value of hardness is read. Using this method, hardnesses at three points (six points in total) are measured for each of one bottom surface and the other bottom surface, and the average value is calculated as the bottom surface hardness.

The side surface of the water purification filter of the present invention preferably has a hardness of 20 to 90, more preferably 40 to 60, still more preferably 40 to 50, although not limited thereto, from the viewpoint of more satisfactorily producing the effect of reducing cracking or chipping in the water purification filter; the effect of improving the handleability; and the effect of improving the filtration flow rate. As used herein, the side surface hardness of the water purification filter is the value as measured using a durometer. The specific measurement method is as follows: First, the bottom surface of the water purification filter is fixed horizontally. Then, using a durometer having a hemispherical indenter shape with a diameter of 5.08±0.02 mm, the presser foot of the durometer indenter is moved horizontally and contacted with the side surface of the water purification filter, and then immediately the measurement value of hardness (side surface hardness) is read. Using this method, hardnesses of the side surface are measured at three points equally spaced along the circumferential direction of the center of the height direction (from one bottom surface to the other) of the water purification filter, and the average value is calculated as the side surface hardness.

The height (length from one bottom to the other) of the water purification filter of the present invention may be set appropriately according to the type and the like of the water purifier to be used, and is, for example, 10 to 250 mm.

When the water purification filter of the present invention has a cylindrical shape, the thickness may be set appropriately according to the type and the like of the water purifier to be used, and is, for example, 2.5 to 50 mm, from the viewpoint of the water purification performance and the water permeability. As used herein, the thickness of the cylindrical water purification filter is the value obtained by subtracting the inner diameter from the outer diameter. The inner diameter is defined as follows: In a cross section perpendicular to the height direction of the water purification filter, it is the diameter of the space communicating from the center of one bottom surface to the center of the other bottom surface. The outer diameter is defined as follows: In a cross section perpendicular to the height direction of the water purification filter, it is the diameter of the water purification filter including the space.

When the water purification filter of the present invention has a cylindrical shape, the inner and outer diameters may be set appropriately to satisfy the above-mentioned range of thickness. Specifically, the inner diameter is, for example, 5 mm or more, and the outer diameter is, for example, 15 to 150 mm.

When the water purification filter of the present invention has a columnar shape, the diameter may be set appropriately according to the type and the like of the water purifier to be used, and is, for example, 5 to 100 mm, from the viewpoint of the water purification performance and the water permeability. As used herein, the diameter of the columnar water purification filter is the diameter of a circular cross section perpendicular to the height direction of the water purification filter.

The volume of the water purification filter of the present invention may be set appropriately according to the type and the like of the water purifier to be used, and is, for example, 1 to 500 cm$^3$. The volume of the water purification filter of the present invention is the value as calculated according to the following equation:

$$\text{volume of cylindrical water purification filter} = \{(\text{outer diameter}/2)^2 - (\text{inner diameter}/2)^2\} \times \pi \times \text{height}$$

$$\text{volume of columnar water purification filter} = (\text{outer diameter}/2)^2 \times \pi \times \text{height}$$

The water purification filter of the present invention can be produced, for example, by sequentially performing the following first to third steps:
   a first step of winding a nonwoven sheet containing the fibrous activated carbon and the heat fusible core-sheath composite fiber around a winding core;
   a second step of subjecting the wound nonwoven sheet to a heat treatment to partially or completely melt the sheath portion of the heat fusible core-sheath composite fiber, followed by cooling; and
   a third step of removing the winding core after the cooling.

The nonwoven sheet used in the first step may be any nonwoven sheet that contains the fibrous activated carbon and the heat fusible core-sheath composite fiber. The content of the fibrous activated carbon and the content of the heat fusible core-sheath composite fiber in the nonwoven sheet are the same as those in the water purification filter of the present invention.

The nonwoven sheet used in the first step has a weight of, for example, 10 to 100 g/m$^2$, preferably 50 to 80 g/m$^2$. The nonwoven sheet used in the first step has a thickness of, for example, 0.2 to 1.0 mm, preferably 0.3 to 0.7 mm.

The type of the nonwoven sheet used in the first step is not limited as long as it contains the fibrous activated carbon and the heat fusible core-sheath composite fiber. Preferably, the nonwoven sheet is a drylaid nonwoven fabric, and more preferably a needle-punched nonwoven fabric. Drylaid nonwoven fabrics tend to have a lower density, compared to nonwoven fabrics produced by wetlaid paper-making, for example, and thus, are suitable for producing a water purification filter having a density in the above-mentioned range.

The winding core used in the first step may be any winding core that is not deformed by the heat treatment in the second step, and may be made of resin, for example. The diameter of the winding core corresponds to the inner diameter of the water purification filter of the present invention, and thus, the diameter of the winding core used in the first step may be set according to the inner diameter that the water purification filter of the present invention should have.

In the first step, the nonwoven sheet is preferably wound around the winding core under tension.

The heat treatment in the second step may be performed under a temperature condition that partially or completely melts the biodegradable polyester resin of the sheath portion of the heat fusible core-sheath composite fiber contained in the nonwoven sheet. The temperature condition may be set in the range of temperatures not lower than the melting point of the biodegradable polyester resin of the sheath portion of the heat fusible core-sheath composite fiber and lower than the melting point of the synthetic resin of the core portion of the heat fusible core-sheath composite fiber. Specifically, the temperature condition for the heat treatment in the second step is not lower than the melting point of the biodegradable polyester resin of the sheath portion of the heat fusible core-sheath composite fiber, and at most 40° C. higher than that melting point; and preferably not lower than the melting point of the biodegradable polyester resin of the sheath portion of the heat fusible core-sheath composite fiber, and at most 30° C. higher than that melting point.

The time of the heat treatment in the second step may be set to partially or completely melt the biodegradable polyester resin of the sheath portion of the heat fusible core-sheath composite fiber contained in the nonwoven sheet, and is, for example, 0.3 to 1.5 hours, and preferably 0.5 to 1.2 hours.

In the second step, after the heat treatment, the cooling is performed until the melted biodegradable polyester resin of the sheath portion solidifies. The cooling in the second step causes the melted biodegradable polyester resin of the sheath portion to solidify with fibers of the fibrous activated carbon being fused to one another, to form the water purification filter of the present invention. The heat treatment in the second step is performed under a temperature condition lower than the melting point of the synthetic resin of the core portion of the heat fusible core-sheath composite fiber, and thus, after the second step, the synthetic resin of the core portion of the heat fusible core-sheath composite fiber contained in the nonwoven sheet is not melted and retains its original shape.

In the third step, the winding core is removed after the second step to produce the water purification filter of the present invention. After the third step, the height of the water purification filter may be adjusted as required, by cutting the water purification filter in a plane direction perpendicular to the height direction to achieve a predetermined height.

<Uses of Water Purification Filter of the Present Invention>

While the water purification filter of the present invention can be used as water purification filters for various water purifiers, it is suitable for use as a filter for a pot-type (pitcher-type) water purifier, in which raw water stored in the raw water reservoir (reservoir tank) drops under its own weight and passes through the filter to be purified. When the water purification filter of the present invention is used for a pot-type water purifier, preferably, as shown in FIG. 1, the water purification filter has a cylindrical shape, and is placed such that the axial direction of the cylinder (vertical direction in FIG. 1) corresponds to the vertical direction, and the raw water to be purified is radially passed through the water purification filter 1 (specifically, (1) the raw water flowing into the space 3 radially passes through the water purification filter, and flows out through the side surface 12; or (2) the raw water flowing in through the side surface 12 radially passes through the water purification filter, and flows out through the space 3).

The pot-type water purifier is a water purifier including:
a casing including a raw water reservoir and a purified water reservoir separated in upper and lower sections, and a purified water pouring spout communicating with the purified water reservoir; and
a water purification cartridge interchangeably disposed between the raw water reservoir and the purified water reservoir, the water purification cartridge including a raw water inlet that is open to the raw water reservoir and a purified water outlet that is open to the purified water reservoir; wherein
the raw water (water to be purified) stored in the raw water reservoir drops under its own weight and passes through the water purification cartridge, and the purified water is stored in the purified water reservoir.

The water purified by the pot-type water purifier is poured out of the water purifier through the purified water pouring spout of the casing.

When the water purification filter of the present invention is used for a pot-type water purifier, it is used by being housed in the water purification cartridge.

The water purification cartridge is preferably configured such that the raw water guided through the raw water inlet radially passes through the water purification filter of the present invention to be guided into the purified water reservoir through the purified water outlet. Specifically, preferred embodiments of the water purification cartridge include an embodiment in which the raw water guided through the raw water inlet is guided into the space (hollow portion) of the water purification filter of the present invention, and then flows out through the side surface of the water purification filter of the present invention to be guided into the purified water reservoir through the purified water outlet; or an embodiment in which the raw water guided through the raw water inlet is guided into the side-surface side of the water purification filter of the present invention, and then flows out through the space (hollow portion) of the water purification filter of the present invention to be guided into the purified water reservoir through the purified water outlet.

Examples of water to be purified by the water purification filter of the present invention include, but are not limited to, drinking water, tap water, water for industrial use, and water for agricultural use, with drinking water and tap water being preferred.

B. Method of Purifying Water

A method of purifying water according to the present invention includes passing raw water to be purified through the water purification filter. In the method of purifying water of the present invention, the structure of the water purification filter to be used, the method of passing the raw water through the water purification filter, the type of raw water to be purified, and the like are as described in the "A. Water Purification Filter" section above.

EXAMPLES

The present invention will be hereinafter described in detail with reference to examples; however, the present invention is not limited thereto.

1. Production of Water Purification Filter

Example 1

Fibrous activated carbon available under the trade name A-10 (specific surface area: 1300 m²/g, average fiber diameter: 17 μm) from UNITIKA LTD. was prepared.

A core-sheath composite fiber (fineness: 2.2 dtex, average fiber length: 51 mm) was also prepared. The core-sheath composite fiber included a core portion formed of polylactic acid (melting point: 170° C., glass transition point: 57° C.), which is a copolymer of D-lactic acid and L-lactic acid (D-form content: 1.4 mol %); and a sheath portion formed of polylactic acid (melting point: 130° C., melt flow rate: 10 g/10 mm), which is a copolymer of D-lactic acid and L-lactic acid (D-form content: 10 mol %). The mass ratio of the core portion to the sheath portion (core portion/sheath portion) was 5/5. The core-sheath composite fiber had a circular cross-sectional shape.

60 parts by mass of the fibrous activated carbon prepared above and 40 parts by mass of the core-sheath composite fiber prepared above were mixed and then carded to form a thin web. The web was needle punched and then heat treated at an atmosphere temperature of 90° C., and then cooled. As a result, a needle-punched nonwoven fabric A was obtained. The nonwoven fabric had a weight of 65 g/m$^2$ and a thickness of 0.50 mm.

An iron cylindrical pipe with an outer diameter of 27.6 mm was prepared as a winding core, and the needle-punched nonwoven fabric A obtained above was wound around the winding core to a predetermined outer diameter. Then, the needle-punched nonwoven fabric A in the wound state was placed in a furnace and heat treated at an atmosphere temperature of 130° C. for 1 hour, and then allowed to cool naturally. The winding core was then removed, and then the needle-punched nonwoven fabric A was cut to a length of 82 mm with a cutting machine to give a cylindrical water purification filter. The water purification filter had a height of 82 mm, an outer diameter of 38.5 mm, and an inner diameter of 27.6 mm. In the water purification filter, fibers of the fibrous activated carbon had been fused and fixed to one another, with the polylactic acid disposed as the sheath portion of the core-sheath composite fiber in a partially solidified state after being melted. The core portion of the core-sheath composite fiber showed little or no thermal deformation.

Example 2

An iron cylindrical pipe with an outer diameter of 27.6 mm was prepared as a winding core, and the same needle-punched nonwoven fabric A as in Example 1 was wound around the winding core to a predetermined outer diameter. Then, the needle-punched nonwoven fabric A in the wound state was placed in a furnace and heat treated at an atmosphere temperature of 150° C. for 1 hour, and then allowed to cool naturally. The winding core was then removed, and then the needle-punched nonwoven fabric A was cut to a length of 82 mm with a cutting machine to give a cylindrical water purification filter of the present invention. The water purification filter had a height of 82 mm, an outer diameter of 38.5 mm, and an inner diameter of 27.6 mm. In the water purification filter, fibers of the fibrous activated carbon had been fused and fixed to one another, with the polylactic acid disposed as the sheath portion of the core-sheath composite fiber in a mostly solidified state after being melted. The core portion of the core-sheath composite fiber showed slight thermal deformation.

Example 3

Fibrous activated carbon available under the trade name A-15 (specific surface area: 1700 m$^2$/g, average fiber diameter: 16 μm) from UNITIKA LTD. was prepared.

A core-sheath composite fiber (fineness: 2.2 dtex, average fiber length: 51 mm) was also prepared. The core-sheath composite fiber included a core portion formed of polylactic acid (melting point: 170° C., glass transition point: 57° C.), which is a copolymer of D-lactic acid and L-lactic acid (D-form content: 1.4 mol %); and a sheath portion formed of polylactic acid (melting point: 130° C., melt flow rate: 10 g/10 mm), which is a copolymer of D-lactic acid and L-lactic acid (D-form content: 10 mol %). The mass ratio of the core portion to the sheath portion (core portion/sheath portion) was 5/5. The core-sheath composite fiber had a circular cross-sectional shape.

80 parts by mass of the fibrous activated carbon prepared above and 20 parts by mass of the core-sheath composite fiber prepared above were mixed and then carded to form a thin web. The web was needle punched and then heat treated at an atmosphere temperature of 90° C., and then cooled. As a result, a needle-punched nonwoven fabric B was obtained. The nonwoven fabric had a weight of 65 g/m$^2$ and a thickness of 0.52 mm.

An iron cylindrical pipe with an outer diameter of 27.6 mm was prepared as a winding core, and the needle-punched nonwoven fabric B obtained above was wound around the winding core to a predetermined outer diameter. Then, the needle-punched nonwoven fabric B in the wound state was placed in a furnace and heat treated at an atmosphere temperature of 130° C. for 1 hour, and then allowed to cool naturally. The winding core was then removed, and then the needle-punched nonwoven fabric B was cut to a length of 82 mm with a cutting machine to give a cylindrical water purification filter. The water purification filter had a height of 82 mm, an outer diameter of 38.5 mm, and an inner diameter of 27.6 mm. In the water purification filter, fibers of the fibrous activated carbon had been fused and fixed to one another, with the polylactic acid disposed as the sheath portion of the core-sheath composite fiber in a partially solidified state after being melted. The core portion of the core-sheath composite fiber showed little or no thermal deformation.

Example 4

Fibrous activated carbon available under the trade name A-10 (specific surface area: 1300 m$^2$/g, average fiber diameter: 17 μm) from UNITIKA LTD. was prepared.

A core-sheath composite fiber (fineness: 2.2 dtex, average fiber length: 51 mm) was also prepared. The core-sheath composite fiber included a core portion formed of polylactic acid (melting point: 170° C., glass transition point: 57° C.), which is a copolymer of D-lactic acid and L-lactic acid (D-form content: 1.4 mol %); and a sheath portion formed of polybutylene succinate (melting point: 120° C., melt flow rate: 15 g/10 mm). The mass ratio of the core portion to the sheath portion (core portion/sheath portion) was 5/5. The core-sheath composite fiber had a circular cross-sectional shape.

60 parts by mass of the fibrous activated carbon prepared above and 40 parts by mass of the core-sheath composite fiber prepared above were mixed and then carded to form a thin web. The web was needle punched and then heat treated at an atmosphere temperature of 90° C., and then cooled. As a result, a needle-punched nonwoven fabric C was obtained. The nonwoven fabric had a weight of 66 g/m$^2$ and a thickness of 0.55 mm.

An iron cylindrical pipe with an outer diameter of 27.6 mm was prepared as a winding core, and the needle-punched nonwoven fabric C obtained above was wound around the winding core to a predetermined outer diameter. Then, the needle-punched nonwoven fabric C in the wound state was placed in a furnace and heat treated at an atmosphere temperature of 130° C. for 1 hour, and then allowed to cool naturally. The winding core was then removed, and then the needle-punched nonwoven fabric C was cut to a length of 82 mm with a cutting machine to give a cylindrical water purification filter. The water purification filter had a height of 82 mm, an outer diameter of 38.5 mm, and an inner diameter of 27.6 mm. In the water purification filter, fibers of the fibrous activated carbon had been fused and fixed to one another, with the polybutylene succinate disposed as the sheath portion of the core-sheath composite fiber in a partially solidified state after being melted. The core portion of the core-sheath composite fiber showed little or no thermal deformation.

Example 5

An iron cylindrical pipe with an outer diameter of 27.6 mm was prepared as a winding core, and the same needle-punched nonwoven fabric C as in Example 4 was wound around the winding core to a predetermined outer diameter. Then, the needle-punched nonwoven fabric C in the wound state was placed in a furnace and heat treated at an atmosphere temperature of 150° C. for 1 hour, and then allowed to cool naturally. The winding core was then removed, and then the needle-punched nonwoven fabric C was cut to a length of 82 mm with a cutting machine to give a cylindrical water purification filter. The water purification filter had a height of 82 mm, an outer diameter of 38.5 mm, and an inner diameter of 27.6 mm. In the water purification filter, fibers of the fibrous activated carbon had been fused and fixed to one another, with the polybutylene succinate disposed as the sheath portion of the core-sheath composite fiber in a mostly solidified state after being melted. The core portion of the core-sheath composite fiber showed slight thermal deformation.

2. Methods of Measuring Physical Properties and the Like

<Specific Surface Areas of Fibrous Activated Carbon and Water Purification Filter>

The specific surface areas of fibrous activated carbon and a water purification filter were calculated based on nitrogen adsorption isotherms at 77.4 K. Specifically, the measurement method was as follows: First, using an automatic gas adsorption volume measuring apparatus (trade name "AUTOSORB-1-MP" (QUANTCHROME)), a sample (fibrous activated carbon or a water purification filter) was cooled to 77.4 K (the boiling point of nitrogen), nitrogen gas was introduced, and the amount of nitrogen gas adsorbed V cc/g was measured using the volumetric method. In the measurement, the pressure P [hPa] of nitrogen gas being introduced was gradually increased, and the value obtained by dividing the pressure P [hPa] by the saturation vapor pressure P0 [hPa] of nitrogen gas was defined as the relative pressure P/P0. Amounts of nitrogen gas adsorbed were plotted against these relative pressures to create a nitrogen adsorption isotherm. Using the analysis programs included in the apparatus, the specific surface area was determined according to the BET method, based on the nitrogen adsorption isotherm.

<Average Fiber Diameter of Fibrous Activated Carbon>

The average fiber diameter of fibrous activated carbon was measured using a reflection microscope according to "7.3.1 Fiber diameter" in the Japanese Industrial Standard JIS K 1477:2007 "Test methods for fibrous activated carbon".

<Melting Point of Biodegradable Polyester Resin>

A differential scanning calorimeter (DSC) was used to obtain a melting endothermic curve by measurement at a heating rate of 20° C./min, and the temperature giving the extreme value in the melting endothermic curve was defined as the melting point.

<D-Lactic Acid Content in Polylactic Acid>

0.3 g of polylactic acid was added to 6 mL of a methanol solution containing 1 N potassium hydroxide, and the mixture was stirred thoroughly at 65° C. Then, 450 μL of sulfuric acid was added and the mixture was stirred at 65° C. to cause degradation of the polylactic acid, and then 5 mL of the resultant sample was measured out. This sample was mixed with 3 mL of pure water and 13 mL of methylene chloride, and shaken. After the mixture was allowed to separate, about 1.5 mL of the lower organic phase was collected and filtered through a disc filter for HPLC with a pore size of 0.45 μm, and then the resultant product was subjected to measurement by gas chromatography using HP-6890 Series GC system from Hewlett Packard. The ratio (%) of the peak area of D-lactic acid methyl ester to the total peak area of lactic acid methyl ester was calculated as the D-lactic acid content (mol %) in the polylactic acid.

<Melt Flow Rate of Biodegradable Polyester Resin of Sheath Portion>

The biodegradable polyester resin used as the sheath portion was prepared as a sample for measurement of the melt flow rate. The melt flow rate was measured under a test temperature of 190° C. and a load of 2.16 kg, according to "Method A: mass measurement method" as specified in the Japanese Industrial Standard JIS K7210-1:2014 "Plastics-Determination of the melt mass-flow rate (MFR) and melt volume-flow rate (MVR) of thermoplastics—Part 1: Standard method".

<Glass Transition Point of Biodegradable Polyester Resin of Core Portion>

The biodegradable polyester resin used as the core portion was prepared as a sample for measurement of the glass transition point. Specifically, a differential scanning calorimeter (DSC) was used to obtain a heating curve by measurement at a heating rate of 20° C./min, and the glass transition point was determined as the intermediate value between the temperatures at the two inflection points derived from glass transition in the heating curve.

<Density of Water Purification Filter>

A water purification filter was dried at 80° C. in a hot air dryer for 3 hours, and cooled to room temperature in a desiccator. Then, the mass of the water purification filter was measured. The density of the water purification filter was calculated by dividing the resultant mass (g) by the volume (cm$^3$) of the water purification filter.

<Hardness of Water Purification Filter>

The bottom surface hardness of a water purification filter was measured using the following method: First, a bottom surface of the water purification filter was fixed horizontally. Then, using a durometer having a hemispherical indenter shape with a diameter of 5.08±0.02 mm (TECLOCK durometer; model GS-701N), the presser foot was contacted with the bottom surface of the water purification filter disposed as the upper side so that the durometer indenter was vertical to the bottom surface, and then immediately the measurement value of hardness was read. Using this method, hardnesses at three points (six points in total) were measured for each of one bottom surface and the other bottom surface, and the average value was calculated as the bottom surface hardness.

The side surface hardness of the water purification filter was measured using the following method: First, a bottom surface of the water purification filter was fixed horizontally. Then, using a durometer having a hemispherical indenter shape with a diameter of 5.08±0.02 mm (TECLOCK durometer; model GS-701N), the presser foot of the durometer indenter was moved horizontally and contacted with the side surface of the water purification filter, and then immediately the measurement value of hardness (side surface hardness) was read. Hardnesses of the side surface were measured at three points equally spaced along the circumferential direction of the center of the height direction (from one bottom surface to the other) of the water purification filter, and the average value was calculated as the side surface hardness.

<Free Residual Chlorine Filtration Capacity of Water Purification Filter>

According to "6.5.2 Free residual chlorine filtration capacity test" as specified in the Japanese Industrial Standard JIS S 3201 2019 "Testing methods for household water purifiers", a continuous-type water purifier was used to measure the free residual chlorine filtration capacity. Specifically, the measurement method was as follows: A water purification filter was sealed on the end surfaces with a hot melt or silicone sealant and then loaded into a stainless steel housing. Separately, adjusted raw water was prepared by adding sodium hypochlorite to tap water purified by an activated carbon filter to adjust the free residual chlorine concentration to 2.0±0.2 mg/L. The adjusted raw water was passed from the outer side into the inner side of the water purifier filter at a flow rate of 1.2 L/min. The free residual chlorine concentration was quantitatively measured using a DPD colorimetric method, before and after the passage through the water purification filter. The point at which the free residual chlorine concentration in the effluent water (filtered liquid) relative to that concentration in the influent water (adjusted raw water) became 20% or higher than the initial value was defined as a breakthrough point, and the total filtrate volume (L) to this breakthrough point was determined.

<Filtration Flow Rate>

(I) Preparation of Reservoir Tank and Cartridge Case

A reservoir tank having a body portion with an oval cross section and in which a cartridge can be installed on the center of the bottom (the bottom area in the reservoir tank: about 95 cm$^2$) was prepared. A cartridge case for a pot-type water purifier (ZR-003-B-4; ZeroWater) was also prepared.

(II) Preparation of Cartridge

A water purification filter was loaded into the cartridge case, and immersed in water for 20 minutes.

(III) Measurement of Filtration Flow Rate

1) The cartridge prepared above was installed onto the reservoir tank, and then 1.2 L of water was added to the reservoir tank, and allowed to drop under its own weight and pass through the cartridge.
2) Once the reservoir tank became empty, 1.2 L of water was added again to the reservoir tank, and allowed to drop under its own weight and pass through the cartridge.
3) The operation in 2) was repeated two more times.
4) 1.2 L of water was added again to the reservoir tank, and the volume of filtrate flowing out in 1 minute (volume of water passed through the cartridge) was measured as the filtration flow rate.

<Evaluation of Amount of Coal Dust During Initial Use of Water Purification Filter>

(I) Preparation of Reservoir Tank and Cartridge Case

A reservoir tank having a body portion with an oval cross section and in which a cartridge can be installed on the center of the bottom (the bottom area in the reservoir tank: about 95 cm$^2$) was prepared. A cartridge case for a pot-type water purifier (ZR-003-B-4; ZeroWater) was also prepared.

(II) Preparation of Cartridge

A water purification filter was loaded into the cartridge case, and immersed in water for 20 minutes.

(III) Evaluation of Amount of Coal Dust

1) The cartridge prepared above was installed onto the reservoir tank, and then 1.2 L of water was added to the reservoir tank, and allowed to drop under its own weight and pass through the cartridge.
2) 0.5 L of the first filtrate (water passed through the cartridge) was collected and filtered through a white membrane filter (pore size: 0.45 μm), and the amount of coal dust remaining on the membrane filter was evaluated according to the following criteria:

Large: visual observation clearly shows the presence of coal dust.

Small: close visual observation shows the presence of coal dust.

Very small: visual observation does not show the presence of coat dust.

<Evaluation of Handleability>

Five panelists performed the operation of replacing the water purification filter to evaluate whether the water purification filter was sufficient for practical use, according to the following criteria:

A: Five out of the five panelists evaluated that a portion of the filter was not chipped or cracked in the replacement operation, and that the filter after being loaded was not deformed by the loading.

B: Four out of the five panelists evaluated that a portion of the filter was not chipped or cracked in the replacement operation, and that the filter after being loaded was not deformed by the loading.

C: Three out of the five panelists evaluated that a portion of the filter was not chipped or cracked in the replacement operation, and that the filter after being loaded was not deformed by the loading.

D: Two or less out of the five panelists evaluated that a portion of the filter was not chipped or cracked in the replacement operation, and that the filter after being loaded was not deformed by the loading.

3. Evaluation Results

Table 1 shows the results for each water purification filter.

TABLE 1

| | | | Example 1 | Example 2 | Example 3 | Example 4 | Example 5 |
|---|---|---|---|---|---|---|---|
| Physical Properties of Fibrous Activated Carbon | Specific Surface Area (m$^3$/g) | | 1300 | 1300 | 1700 | 1300 | 1300 |
| | Content (% by mass) | | 60 | 60 | 80 | 60 | 60 |
| Physical Properties of Core-Sheath Composite Fiber | Core Portion | Resin Type | Polylactic acid | Polylactic acid | Polylactic acid | Polylactic acid | Polylactic acid |
| | | Melting point (° C.) | 170 | 170 | 170 | 170 | 170 |
| | Sheath Portion | Resin Type | Polylactic acid | Polylactic acid | Polylactic acid | Polybutylene Succinate | Polybutylene Succinate |
| | | Melting Point (° C.) | 130 | 130 | 130 | 120 | 120 |
| | Core-to-Sheath Mass Ratio (Core Portion/Sheath Portion) | | 5/5 | 5/5 | 5/5 | 5/5 | 5/5 |

TABLE 1-continued

|  |  | Example 1 | Example 2 | Example 3 | Example 4 | Example 5 |
|---|---|---|---|---|---|---|
|  | Content (% by mass) | 40 | 40 | 20 | 20 | 20 |
| Heat Treatment | Temperature (° C.) | 130 | 150 | 130 | 130 | 150 |
| Conditions in Wound State | Time (min) | 60 | 60 | 60 | 60 | 60 |
| Physical Properties of Water Purification filter | Density (g/cm3) | 0.167 | 0.189 | 0.133 | 0.142 | 0.140 |
|  | Specific Surface Area (m$^2$/g) | 705 | 670 | 1316 | 772 | 781 |
|  | Hardness   Bottom Surface | 36 | 66 | 15 | 47 | 60 |
|  | Side Surface | 48 | 52 | 33 | 42 | 50 |
|  | Free Residual Chlorine Filtration Capacity (L) | 250 | 200 | 1400 | 250 | 200 |
|  | Filtration Flow Rate (L/min) | 0.15 | 0.11 | 0.13 | 0.14 | 0.10 |
|  | Coal Dust | Very Small | Very Small | Small | Very Small | Very Small |
|  | handleability | A | A | B | A | A |

The water purification filters of Examples 1 to 5 contain activated carbon and a biodegradable polyester resin, wherein the activated carbon is fused together with the biodegradable polyester resin. The activated carbon has a fibrous shape. The biodegradable polyester resin has a melting point of 80 to 140° C., and is contained as the sheath portion of the core-sheath composite fiber. The difference between the melting point of the synthetic resin contained as the core portion and the melting point of the biodegradable polyester resin of the core-sheath composite fiber (the melting point of the synthetic resin contained as the core portion−the melting point of the biodegradable polyester resin) is 20° C. or higher. The water purification filter is obtained by winding a nonwoven sheet containing the fibrous activated carbon and the core-sheath composite fiber. The water purification filter has a density of 0.12 to 0.30 g/cm$^3$ and a specific surface area of 500 to 1800 m$^2$/g. The water purification filters satisfying these features (Examples 1 to 5) have a filtration flow rate sufficient for practical use as a pot-type water purifier while maintaining a certain free residual chlorine filtration capacity, and have a certain degree of hardness and excellent handleability.

In particular, the water purification filters of Examples 1, 2, 4, and 5, which have a density of 0.14 to 0.25 g/cm$^3$ while having the above-mentioned features, have an increased hardness and superior handleability while maintaining a certain free residual chlorine filtration capacity. Moreover, the formation of coal dust during initial use of the water purification filter is further prevented in these water purification filters.

In particular, the water purification filters of Examples 1 and 4, which have a bottom surface hardness of 30 to 50 while having the above-mentioned features, have a free residual chlorine filtration capacity and a filtration flow rate even higher than those of the water purification filters of Examples 2 and 5.

REFERENCE SIGNS LIST

1: water purification filter
2: nonwoven sheet
3: space
12: side surface of water purification filter
13: bottom surface (upper surface) of water purification filter

The invention claimed is:

1. A water purification filter obtained by winding a nonwoven sheet containing fibrous activated carbon and a heat fusible core-sheath composite fiber and then heat fusing the sheet, wherein
   a sheath portion of the heat fusible core-sheath composite fiber contains a biodegradable polyester resin having a melting point of 80 to 140° C.,
   a core portion of the heat fusible core-sheath composite fiber contains a synthetic resin having a melting point at least 20° C. higher than the melting point of the biodegradable polyester resin, and
   the water purification filter has a density of 0.12 to 0.30 g/cm$^3$ and a specific surface area of 500 to 1800 m$^2$/g.

2. The water purification filter according to claim 1, wherein the biodegradable polyester resin is an aliphatic polyester resin.

3. The water purification filter according to claim 2, wherein the aliphatic polyester resin is polylactic acid, polyethylene succinate, polybutylene succinate, polybutylene succinate adipate, polybutylene adipate terephthalate, polyethylene terephthalate succinate, or 3-hydroxybutyrate-co-3-hydroxyhexanoate polymer.

4. The water purification filter according to claim 1, wherein the water purification filter has a cylindrical or columnar shape.

5. The water purification filter according to claim 1, wherein the water purification filter is used as a filter for a pot-type water purifier.

6. A method of purifying water, comprising passing raw water to be purified through the water purification filter according to claim 1.

7. The method of purifying water according to claim 6, wherein the method is performed using a pot-type water purifier.

* * * * *